No. 659,450.
E. H. McHENRY.
APPARATUS FOR OBTAINING POWER FROM SOLAR HEAT.
(Application filed Sept. 30, 1897.)
(No Model.)
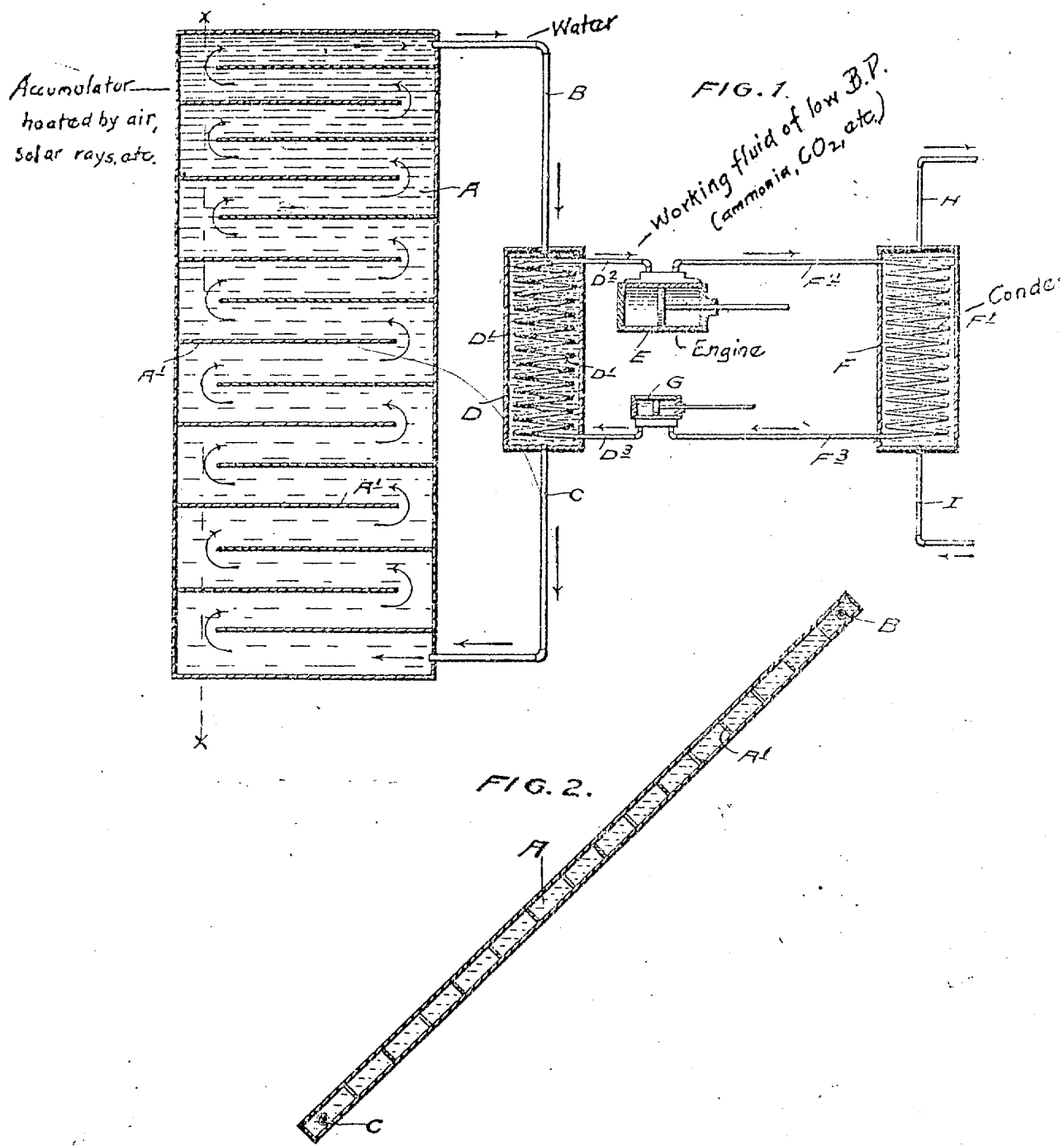

SPECIFICATION forming part of Letters Patent No. 659,450, dated October 9, 1900.

Application filed September 30, 1897. Serial No. 653,661. (No model.)

*To all whom it may concern:*

Be it known that I, EDWIN H. MCHENRY, of St. Paul, Ramsey county, Minnesota, have invented certain Improvements in Apparatus for Obtaining Power from Solar Heat, of which the following is a specification.

My invention relates to improvements in means for developing power from solar heat or other sources of heat of low degree, and particularly within the range of ordinary atmospheric temperatures, its object being to render available that potential latent energy from such sources of heat which has not heretofore been commercially utilized.

To this end my invention consists in providing means for absorbing the heat stored in the atmosphere and in radiated or obscure aberrant rays, &c., and transferring the same to a working fluid having a boiling-point below the atmospheric temperature, suitable means being provided for utilizing the power developed by the vaporization of such working fluid.

My invention further consists in the improved means hereinafter more particularly described and claimed.

In the accompanying drawings, forming part of this specification, Figure 1 is a sectional and diagrammatic view of one form of collector, with means for insuring continuous circulation of the working fluid; and Fig. 2 is a longitudinal section of the collector.

In the drawings, A represents the collector, shown in the form of two parallel sheets of metal of adequate surface area, connected by partitions A', projecting inward from the opposite walls of the collector and constituting a circulating-passage through the same for the confined water. The upper and lower ends of the collector A are connected with the adjacent vaporizing-chamber D by the pipes B and C, respectively. The collector A is ordinarily set at such an incline, as illustrated in Fig. 2, as will establish and maintain by the unequal temperature of the water in the circuit a natural circulation through the vaporizer and connecting pipes.

Within the vaporizer D is arranged the coil D', connected by the pipe $D^2$ with the piston-cylinder E, the opposite end of the cylinder being connected by a pipe $F^2$ with the coil F', arranged in the condensing-chamber F, said coil F' being connected by a pipe $F^3$ with the pump G, which in turn is connected with the coil D' by the connecting-pipe $D^3$. The condensing-chamber F is provided with suitable inlet and outlet pipes H and I. It will be evident that the cycle thus described is similar to that of an ordinary condensing steam-engine.

A working fluid of very low boiling-point contained in the described cycle is caused to circulate in the following manner: The heat from the solar rays, air, or other source is absorbed by the water in the collector A and conveyed by it to the vaporizing-chamber D. The heat thus transferred causes the vaporization of the ammonia, carbonic oxid, or other working liquid in the coil D'. This vapor under tension does work in passing through the cylinder E, being then ejected into the condenser F, from which the products of condensation are forced into the vaporizer D by the pump G, thus completing the cycle.

It will be evident that a variety of constructions may be devised for developing power in accordance with my described method, the object being to provide a construction by which the heat derived from sources of heat of low degree is transferred to a working fluid having a boiling-point below the normal temperature of the heat sources, so that said working fluid is vaporized and power developed within the range of ordinary atmospheric temperatures.

By means of the foregoing-described construction of apparatus it is possible to transfer radiant solar heat and the stored heat of the atmosphere to a working fluid and vaporize it without exposing such fluid to the direct action of the source of heat, thereby avoiding the prohibitive expense of making a structure which would be strong enough to withstand the pressures of the vapor of the working liquid without such liquid being exposed in or caused to circulate through the collector.

I claim—

Means for developing power from atmospheric and solar heat, comprising in combination, a heat-collector; a vaporizing-chamber, and a conduit connecting the same to form a cycle; a coil surrounded and inclosed in said vaporizing-chamber, an engine, a condenser, and a pump, all connected in a cycle; a heat-vehicle, which remains liquid at atmospheric temperature and pressure in the first cycle, and a liquid of boiling-point below atmospheric temperature in the second cycle, said collector being larger than said vaporizing-chamber, and having such superficial area as will cause it, when exposed to the thermal influence of the sun and air, to absorb and transmit to the inclosed liquid that number of heat units which will give to the vaporizing-chamber the required horsepower.

In testimony whereof I affix my signature in presence of two witnesses.

EDWIN H. McHENRY.

Witnesses:
 H. S. JOHNSON,
 MINNIE L. THAUWALD.